I. E. PALMER.
RUNNING GEAR FOR VEHICLES.
APPLICATION FILED JAN. 8, 1908.
1,008,612.
Patented Nov. 14, 1911.
2 SHEETS—SHEET 1.
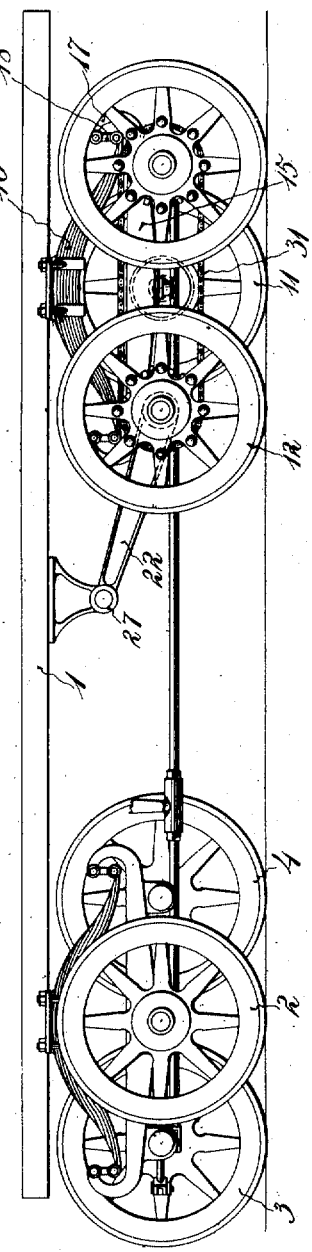
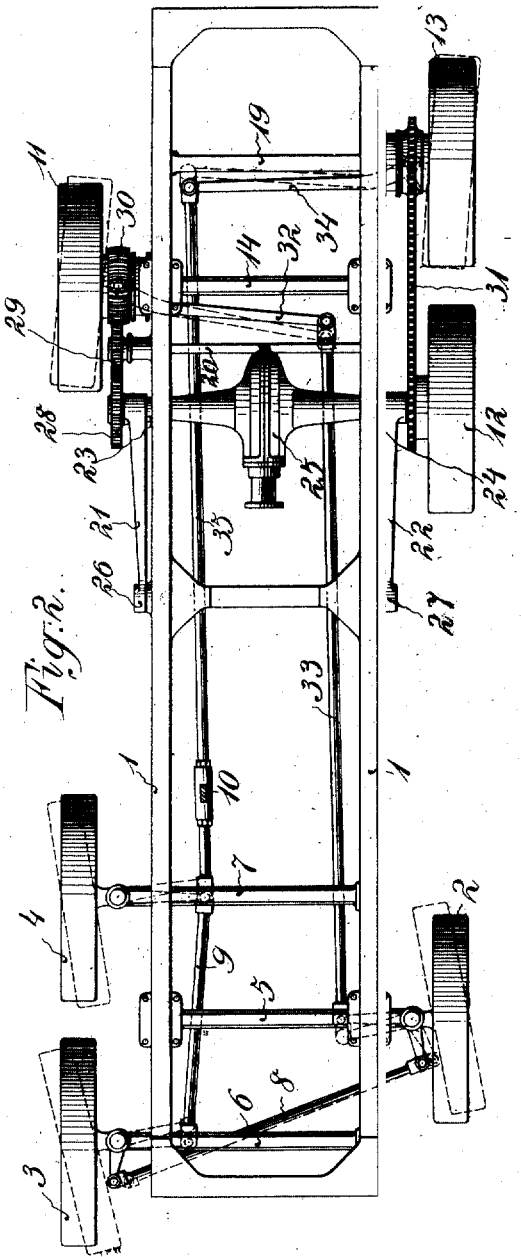
Witnesses.
Inventor.

I. E. PALMER.
RUNNING GEAR FOR VEHICLES.
APPLICATION FILED JAN. 8, 1908.

1,008,612.

Patented Nov. 14, 1911.

2 SHEETS—SHEET 2.

Witnesses.

Inventor.
Isaac E. Palmer
By Brown & Seward
his Attorneys

UNITED STATES PATENT OFFICE.

ISAAC E. PALMER, OF MIDDLETOWN, CONNECTICUT.

RUNNING-GEAR FOR VEHICLES.

1,008,612.  Specification of Letters Patent.  Patented Nov. 14, 1911.

Application filed January 8, 1908. Serial No. 409,753.

*To all whom it may concern:*

Be it known that I, ISAAC E. PALMER, a citizen of the United States, and resident of Middletown, in the county of Middlesex and State of Connecticut, have invented a new and useful Improvement in Running-Gear for Vehicles, of which the following is a specification.

My invention relates to running gear for trackless power driven vehicles, and it has more particularly for its objects to provide a construction whereby if desired, the use of pneumatic tires may be avoided, and also to provide increased traction, to provide more extensive wheel support, so as to reduce the weight upon individual wheels, to reduce the liability of skidding, to provide trucks or semi-trucks, preferably spring-connected to the body of the vehicle, and to provide compensating devices for the various arrangements of wheels.

Figure 3:
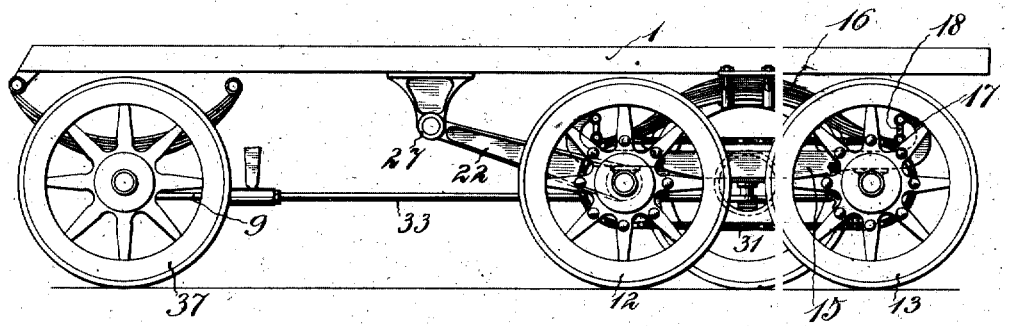
Figure 4:
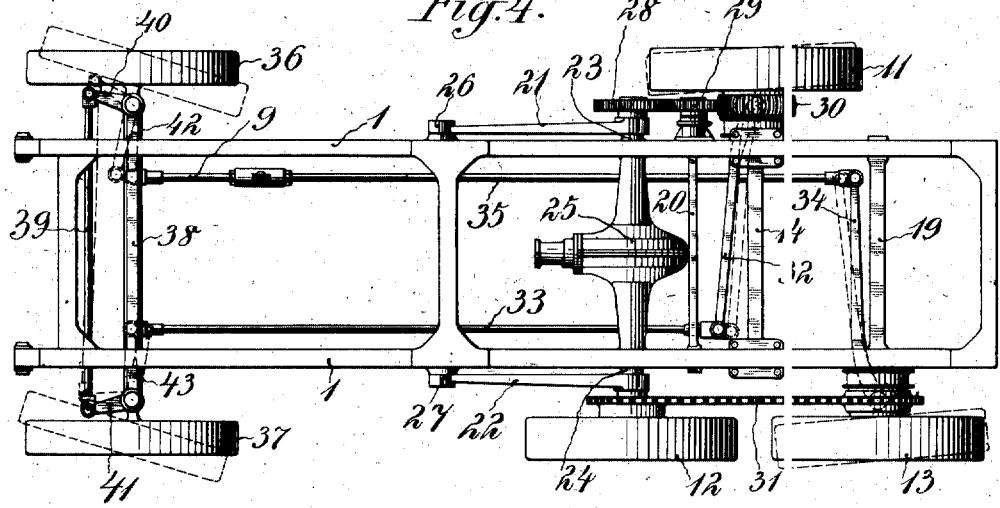
Figure 5:
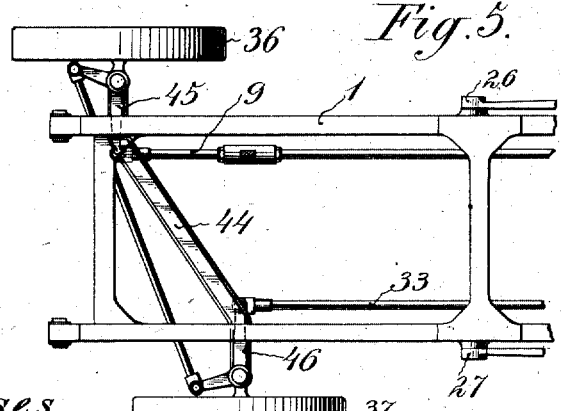

In the accompanying drawings, Figure 1 is a view of the running gear in side elevation, Fig. 2 is a top plan view of the same, Fig. 3 is a view in side elevation of a modified form in which two steering wheels are employed instead of three, Fig. 4 is a top plan view of the same, and Fig. 5 is a partial top plan view of a modified form in which the two steering wheels are arranged out of transverse alinement.

My present invention contemplates a three-wheeled truck for supporting the rear of the vehicle and either a three or two wheeled support for the forward end of the vehicle, the wheels of the three-wheeled group whether at the rear or front being preferably arranged as shown in the drawings with two wheels of the three wheeled group following each other on one side of the vehicle and one wheel on the opposite side of the vehicle mounted in a transverse plane intermediate of the two wheels on the opposite side. Where three steering wheels are employed for supporting the front of the vehicle, I prefer to arrange the two wheels on the opposite side of the vehicle from that on which the two wheels of the rear supporting truck are arranged. Each of the three wheels of the rear truck is preferably made a driving wheel and these three wheels will at all times engage the surface over which the vehicle is traveling no matter how rough or how level it may be thereby insuring a good frictional or driving hold on the surface at three different points at all times. Furthermore, the load at the rear portion of the vehicle will be distributed on three wheels instead of two thereby making it easier on the tires while the arrangement of the wheels is such that they will track perfectly with the forward or steering wheels thereby rendering the construction suitable for country roads which are often very uneven and ridged between the wheel ruts or tracks. When three wheels are used as steering wheels, as shown in Figs. 1 and 2 the third wheel of the three may be arranged to track with one of the other two and distribute their load upon three instead of two tires thereby making it easier upon the tires and they may be arranged with the two wheels on the opposite side of the vehicle from the two wheels on the rear truck and thereby the vehicle body as a whole will have substantially the same amount of support upon its opposite sides.

The body frame of the running gear is denoted by 1.

The three forward or steering wheels (see Figs. 1 and 2) are denoted by 2, 3 and 4, the axles to which said wheels are hinged being denoted, respectively, by 5, 6, and 7, the wheels being hinged to the axles as is common so that they will tilt toward and away from the longitudinal axis of the machine. The more advanced wheels 2 and 3 have their axles connected to a cross rod 8 by means of arms on the axles and a rod 9 connected with the steering gear denoted at 10 is also connected with arms on the axles of the wheels 3 and 4 thereby causing the three wheels 2, 3 and 4 to simultaneously tilt in the same direction for guiding the vehicle.

The three wheels of the rear three-wheeled truck are denoted respectively by 11, 12 and 13. The wheels 12 and 13 are arranged in the present instance on one side of the running gear to track with the wheel 2 and the wheel 11 on the opposite side of the running gear is arranged to track with the steering wheels 3 and 4.

The axle 14 on which the wheel 11 is mounted connects the opposite sides of the truck frame, one side of the truck frame being shown in elevation in Fig. 1, and denoted by 15, it being understood that a similar frame is located at the opposite side of the truck and directly beneath the side rail of the body 1.

The truck is connected to the body frame 1 by springs, in the present instance by heavy leaf springs, denoted by 16, (see Fig. 1), it being understood that a similar spring to the spring 16 is connected by a side bar on the opposite side of the truck and secured to the body rail 1 in a manner similar to that in which the spring 16 is secured to the rail. The side bar 15 and its companion have their opposite ends curved as shown at 17 upwardly and over to permit the end of the spring to be suspended therefrom by means of links 18.

The axle 14 forms a transverse strut between the side bar 15 and its companion bar. The axle 19 on which the wheel 13 is mounted also forms a strut between the side bar 15 of the truck and its companion bar and to make the truck still more stable, a strut 20 is provided forward of the axle 14.

The truck frame is held against a wabbling motion by means of guide bars 21, 22, which lead directly upwardly and forwardly from the bearings 23 and 24 in which the divided drive shaft which passes through the gear casing 25 extends. These bearings 23 and 24 are fixed to the side bar 15 and its companion bar so that the guides 21 and 22 indirectly connect the forward end of the truck frame proper with the body frame 1, their connection with the body frame 1, at 26, 27, being such as to permit such vertical rocking movement of the truck frame as may be required in passing over obstructions in the road.

The divided drive shaft is connected at one end with the hub of the wheel 11 by means of a spur gear wheel 28 on the end of the shaft intermeshing with a gear wheel 29 on a short shaft fixed to the side bar of the truck, the gear 29 engaging a gear 30 on the hub of the wheel. The gear 30 has its teeth curved in the present instance convex and made longer than the teeth on the wheel 29 which in turn are curved concave so as to permit the wheel 11 to be swung or tilted toward or away from the longitudinal axis of the running gear without throwing the driving gear out of mesh. The opposite end of the divided drive shaft on which the wheel 12 is fixed is connected by a sprocket chain 31 with the hub of the wheel 13, the wheel 13 being hinged to its axle 19 to swing or tilt toward and away from the longitudinal axis of the gear.

The wheel 11 is tilted or swung by means of a lever 32 extending transversely a portion of the way across the running gear, the end of the lever 32 being connected by a rod 33 with an arm on the hub of the wheel 2. In like manner, the wheel 13 has an arm 34 extending in a transverse direction from the hub across the running gear and its end is connected by a rod 35 with the steering gear rod 9. By means of these connections the wheels 11 and 13 are simultaneously tilted to a slight extent at the same time the steering wheels 2, 3, and 4, are tilted for the purpose of overcoming the lateral drag of the rear wheels in turning corners or passing around corners.

The several driving wheels 11, 12 and 13 are free to seat themselves in gripping contact with the surface of the ground whatever be the unevenness of the ground and this without disturbing the position of the body of the running gear so far as slight obstruction is concerned and the relation of the three wheels being staggered with respect to each other, they will pass over any obstructions which extend over the path of the vehicle, the wheel 12 passing over first and this followed by the wheel 11 and this in turn followed by the wheel 13.

The many advantages which have hereinabove been recited with respect to the driving wheels 11, 12, 13, also apply with equal force to the forward steering wheels 2, 3 and 4, and these wheels 2, 3 and 4 may be mounted in a truck frame quite similar to the truck frame already described in connection with the driving wheels 11, 12 and 13.

Instead of the three steering wheels in front, two steering wheels may be employed as shown in Figs. 3 and 4, arranged in transverse alinement as denoted by 36, 37, the said wheels being hinged to an axle 38 and connected by means of a cross rod 39 by means of arms 40 and 41 on the hubs of the wheels. In this instance, the rod 35 and its extension 9 will be connected with an arm 42 on the hub of the wheel 36 while the rod 33 will be connected with an arm 43 on the hub of the wheel 37.

Instead of the two steering wheels 36 and 37 being arranged in transverse alinement, they may be arranged as shown in Fig. 5 out of transverse alinement and hinged to an axle 44, the steering rod 9 being connected with an arm 45 on the hub of the wheel 36 and the rod 33 being connected with an arm 46 on the hub of the wheel 37.

What I claim is:—

1. In running gear for vehicles, the combination with forward steering wheels, of a three-wheeled truck for the rear of the vehicle the three wheels of the truck being arr. d in staggered relation to one another.

2. In running gear for vehicles, the combination with forward steering wheels, of a three-wheeled truck for supporting the rear of the vehicle, the three wheels being arranged in staggered relation to one another and a wheel being arranged to tilt or swing toward and away from the longitudinal axis of the vehicle.

3. In running gear for vehicles, the combination with forward steering wheels, of a three-wheeled truck for supporting the rear of the vehicle, the three wheels being arranged in staggered relation to one another and a plurality of truck wheels being arranged to tilt or swing toward and away from the longitudinal axis of the vehicle.

4. In running gear for vehicles, the combination with forward steering wheels, of a three-wheeled truck for supporting the rear of the vehicle, the three wheels being arranged in staggered relation to one another and one wheel of said truck on one side of the machine and another wheel of said truck on the opposite side of the machine being arranged to tilt or swing toward and away from the longitudinal axis of the vehicle.

5. In running gear for vehicles, the combination with forward steering wheels, of a three-wheeled truck for supporting the rear of the vehicle, each of said three wheels of the truck being drive wheels.

6. In running gear for vehicles, the combination with forward steering wheels, of a three-wheeled truck for supporting the rear of the vehicle, two of said truck wheels being arranged to track with one of the forward steering wheels and the third wheel of the three wheeled truck being arranged to track with another of said forward-steering wheels.

7. In running gear for vehicles, the combination with a three-wheeled truck for supporting the rear of the vehicle, of a three-wheeled truck for supporting the forward part of the vehicle, the wheels of the two trucks being arranged in staggered relation to one another from front to rear and said forward wheels being arranged to tilt toward and away from the longitudinal axis of the vehicle.

8. In running gear for vehicles, the combination with a three-wheeled truck for supporting the rear of the vehicle, of three wheels for supporting the forward part of the vehicle, the said three wheels being arranged two on one side of the vehicle and one on the opposite side of the vehicle and in staggered relation to one another.

9. In running gear for vehicles, the combination with a three-wheeled truck for supporting the rear of the vehicle, two of said wheels being arranged on one side of the vehicle and one on the opposite side of the vehicle, of a three-wheeled truck for supporting the forward end of the vehicle, two of said wheels being arranged on one side of the vehicle and one on the opposite side of the vehicle, the sum of the forward and rear wheels on one side of the vehicle being equal to the sum of the forward and rear wheels on the opposite side of the vehicle.

In testimony, that I claim the foregoing as my invention, I have signed my name in presence of two witnesses this 4th day of January 1908.

ISAAC E. PALMER.

Witnesses:
CHAS. M. SAUER,
REUBEN M. BURR.